Figure 4:
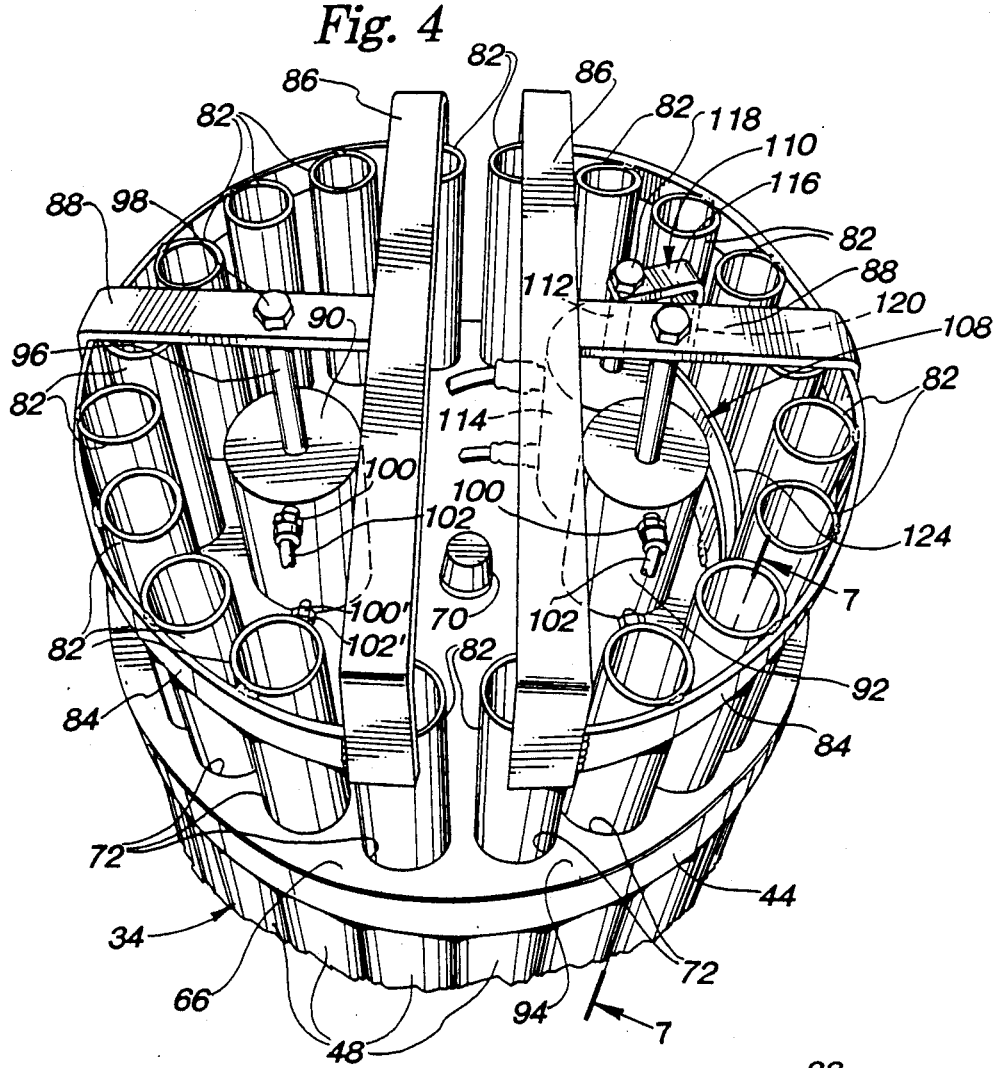

United States Patent [19]

Fairchild

[11] Patent Number: 4,989,784

[45] Date of Patent: Feb. 5, 1991

[54] FERTILIZER APPLICATOR ATTACHMENT

[76] Inventor: Dean S. Fairchild, 1481 N. Birch Lake Blvd., White Bear Lake, Minn. 55110

[21] Appl. No.: 365,752

[22] Filed: Jun. 13, 1989

[51] Int. Cl.[5] ............................................. A01C 15/04
[52] U.S. Cl. .................................... 239/114; 406/132; 406/183
[58] Field of Search ............... 406/181, 183, 132, 155, 406/192; 239/114, 115, 654, 650, 661

[56] References Cited

U.S. PATENT DOCUMENTS

| | | | |
|---|---|---|---|
| 211,182 | 1/1879 | Record | 222/330 X |
| 1,805,940 | 5/1931 | Dolan | 406/181 X |
| 2,314,031 | 3/1943 | Colburn | 406/132 X |
| 4,489,892 | 12/1984 | Tyler | 239/655 X |
| 4,497,475 | 2/1985 | Fuchs et al. | 239/114 X |

Primary Examiner—Andres Kashnikow
Assistant Examiner—Kevin P. Weldon
Attorney, Agent, or Firm—Lawrence M. Nawrocki

[57] ABSTRACT

An attachment for use with a fertilizer distributor apparatus (22). The attachment includes a plurality of plungers (82) comprising an assembly for cleaning entry ports (46) to distributor conduits (48) and for governing which ports (46) fertilizer will be channelled into. A preferred embodiment of the invention comprises two gangs of plungers (82), one gang for entry into ports (46) leading to distributor conduits (48) extending to a boom (62) on one side of a distribution vehicle (20). The other gang of plungers (82) controls entry of fertilizer into and through entry ports (46) opening into distributor conduits (48) leading to the boom (62) on the other side of the vehicle (20).

7 Claims, 4 Drawing Sheets

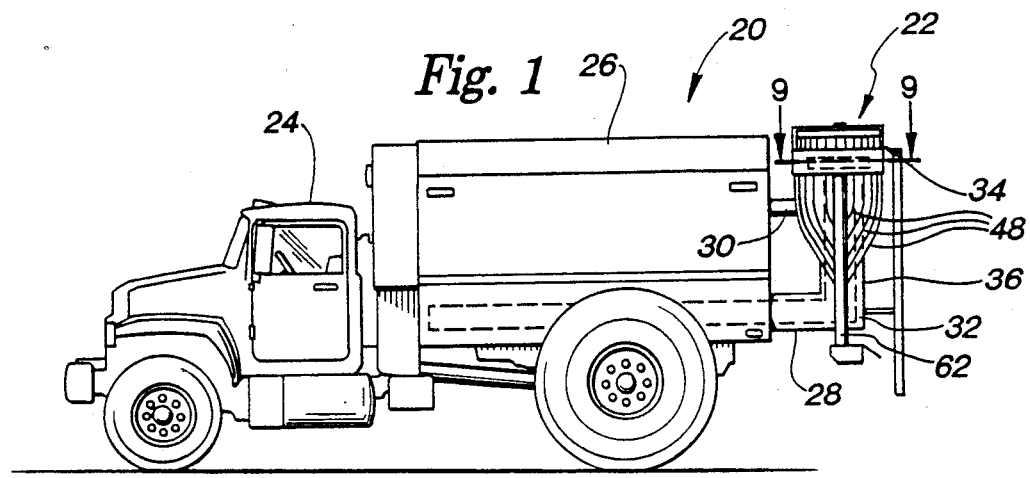
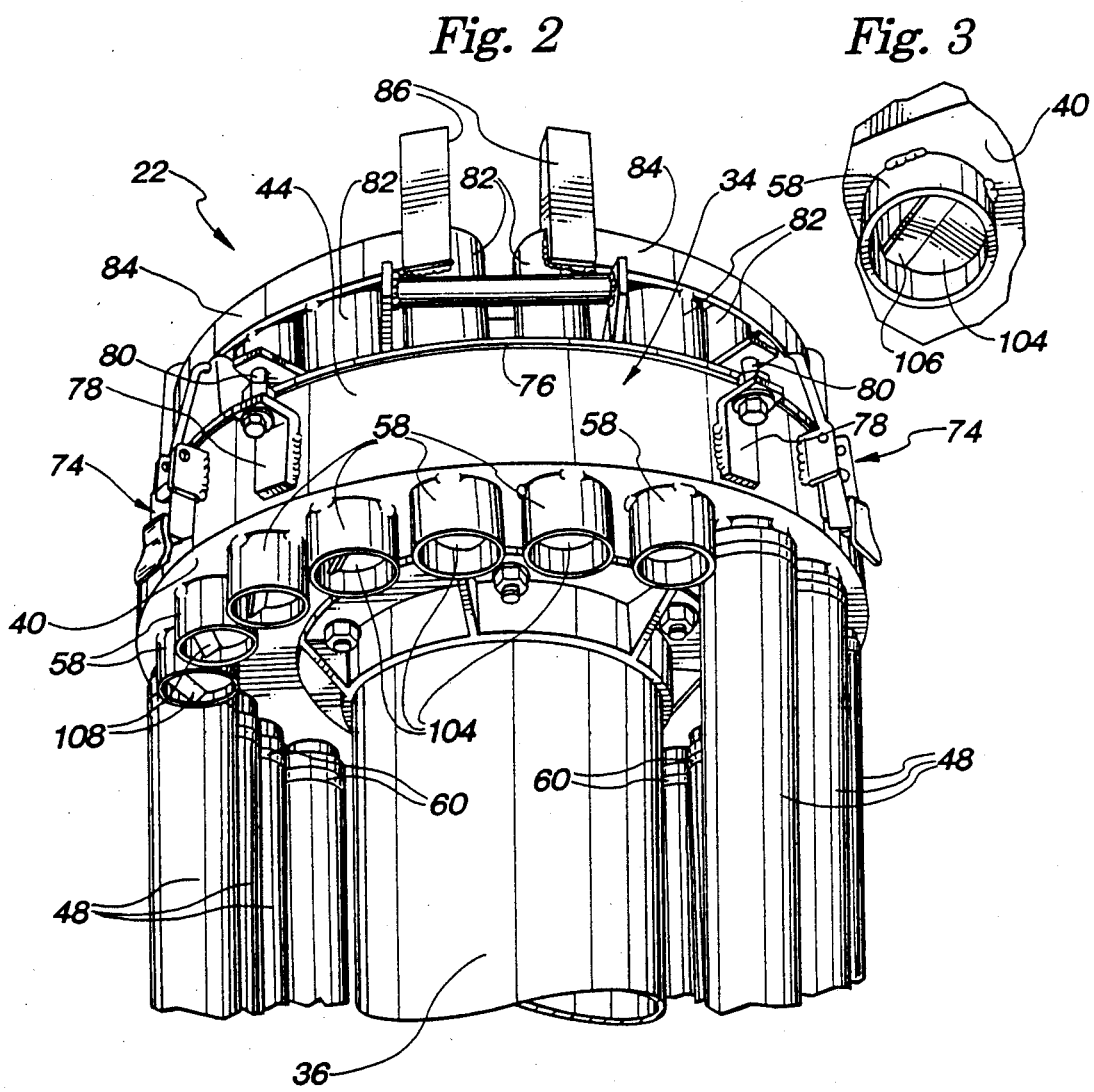

4,989,784

FERTILIZER APPLICATOR ATTACHMENT

TECHNICAL FIELD

The present invention deals broadly with the field of agricultural implements. More narrowly, however, the present invention is related to implements for distributing fertilizer in a cultivated field. It is intended particularly for use with such devices which are employed to distribute a powdered or granular fertilizer which has been mixed with a liquid and/or granule pesticide. The invention functions to both clean entry ports opening into distribution conduits, and to govern through which conduits fertilizer will be distributed.

BACKGROUND OF THE INVENTION

As agriculture has developed over the centuries, means and methods employed in the agricultural industry have grown in sophistication as technology has advanced. Various chemical preparations have been developed for application to a crop to maximize crop yield. The attention of numerous chemical companies has focused upon the development of fertilization techniques and fertilizer preparations. Similarly, significantly improved products have been developed in the area of pesticides.

Certainly, various types of fertilizers are available. One need only watch television in an agricultural area during the appropriate season, and he will observe a plethora of advertisements for products of numerous companies. Typically, however, fertilizer products tend to be in the nature of either a powdered or granular form. On the other hand, pesticides tend to be liquid in form.

While different application techniques can be employed, it is, without a doubt, more economical, in terms of both cost and time savings, to apply both a fertilizer and either a pesticide concurrently. The current state-of-the-art is such that the powdered or granular fertilizer is mixed together with the liquid pesticide so that concurrent application can be effected.

"In field impregnation" techniques while accomplishing significant time and cost savings, have resulted in the plugging of distributor heads on various fertilizer applicators. Many applicators known in the art employ a distribution head which includes a manifold, typically circular in construction, which has a plurality of peripherally-disposed, circumferentially-spaced ports formed in the floor thereof. The ports afford entry of a centrifugally-fed paste comprising a mixture of the fertilizer and pesticide into distributor conduits which lead to locations spaced along laterally-extending booms on either side of a vehicle using the applicator of which the distribution head is a part. The vehicle has a reservoir which carries the products which are to be applied to the crop. The product paste is conveyed from the reservoir by appropriate means such as an auger system.

In many applicators known in the art, a generally vertically-extending auger conveys the pasty mixture upward into the distributor head. A rotor having a plurality of paddles is disposed in the distributor head for rotation about a generally vertically-extending axis. The products to be applied are conveyed upwardly into the head manifold to enter the manifold chamber generally centrally therewithin. The rotor paddles engage the product and, in view of the rotor rotation, impel the paste radially outwardly.

A number of attachments known in the prior art include vanes or baffles associated with each entry port. These vanes or baffles are positioned so that centrifugally-impelled product will be directed into the entry ports.

The structure of applicators as defined herein, is efficient to direct a fertilizer/pesticide mix into entry ports to distributor conduits for subsequent feed along the conduits to locations along the laterally-extending booms at which application occurs. The structure, however, has presented problems of another nature. Plugging of distributor heads on various fertilizer applicators has resulted. Such plugging increases down-time and, thereby, expense.

Additionally, plugging increases the likelihood that employees will become exposed to pesticides which otherwise might not be necessary. As can be seen then, there can be consequent health risks.

An additional problem with dual-boom applicators is the potential of crop damage which might result from repeating application to a portion of the field during the last pass proximate the edge. State-of-the-art fertilizer applicators, through their application booms, typically have a 60-foot wide swath. If the last pass need cover anything less than 60 feet, distribution along the full lengths of both booms will result in some overlap. Such overlap can result in crop damage, increased carry-over of pesticides, and potential groundwater contamination.

It is to these problems and dictates of the prior art that the present invention is directed. It is an improved device for effecting "in field impregnation" of fertilizers and pesticides. It affords features not only wherein entry ports to distributor conduits can be cleaned without undue exposure of employees to fertilizers and pesticides, but also wherein distribution of the pasty mixture can be limited to only certain distributor conduits.

SUMMARY OF THE INVENTION

The invention of this document is a device for cleaning the entry port to a distributor conduit which extends from a fertilizer distributor head used in a distribution system carried by a vehicle. The entry port is disposed in the floor of a manifold chamber of the distributor head. The fertilizer mixture is centrifugally fed from a central location within the manifold to a peripherally-disposed location of the entry port. The device includes a plunger which is disposed for movement between a retracted position and an extended position. A distal end of the plunger, when the plunger is in its retracted position, is located so that free centrifugal flow of fertilizer within the distributor head, through the entry port, and into the distributor conduit is permitted. In the extended position of the plunger, the distal end thereof extends through the entry port to obstruct flow of the fertilizer product through the entry port and into the associated distributor conduit. The device employs means for selectively moving the plunger between its retracted and extended positions.

Most fertilizer applicators, typically, are structured having a plurality of circumferentially-spaced, peripherally-disposed entry ports to a corresponding plurality of distributor conduits. Entry ports on one side of the distributor head enter into distributor conduits leading to a boom on one side of the vehicle carrying the distribution system. Entry ports on the other side of the center-line enter into distributor conduits leading to a boom on the other side of the vehicle. One embodiment of the invention employs two gangs of plungers, one gang being associated with entry ports on one side of the center-line, and the other gang being associated with entry ports on the opposite side of the center-line.

Each plunger of the first plurality of ganged-together plungers corresponds to and is registered with, one of the plurality of adjacent entry ports with which the gang is associated. The same is true with the second plurality of ganged-together plungers and the entry ports of which that gang is associated.

The first gang is disposed for movement between a retracted position, wherein distal ends of the plungers are located so as to permit centrifugal flow of fertilizer within the distributor head, through the corresponding entry ports, and into associated distributor conduits leading to the related boom. Extended positions of the plungers are so as to preclude flow of fertilizer through the entry ports associated with the plungers.

In this embodiment, the second gang of plungers is also disposed for movement between retracted and extended positions. This gang also permits flow into the corresponding distributor conduits when retracted, and precludes flow into those conduits when extended.

Means are provided for selectively moving each of the first and second gangs of plungers between their retracted and extended positions. Such means can include first and second pneumatic cylinder actuators, each actuator being operatively connected to a corresponding plurality of ganged-together plungers.

In this embodiment, one gang of plungers can be actuated to dispose the gang in its extended position, while the other gang is actuated to dispose that gang in its retracted position. Such a configuration will ensure distribution of fertilizer to only one laterally-extending boom.

Because rotor rotation is in a particular direction, a first unobstructed entry port will tend to get the greatest allocation of fertilizer mixture. The invention envisions a metering plate, or wall, to ensure a generally equal distribution of fertilizer into each of the unobstructed entry ports. Such a plate, it is envisioned, would take the form of an arcuate, stepped panel. The panel would be inverted so that the unobstructed portions of each graduation would be closest to the floor of the manifold chamber. The first unobstructed entry port, relative to the direction of rotation of the paddles of the rotor, would have the smallest entry gate to allow passage of fertilizer mixture. The second entry port would have a gate slightly larger, in view of the decreased accumulation of centrifugally-impelled mixture. Successive entry ports would have larger gates, until a point at which no restriction would be necessary, since the effect at that point would be such as if no entry ports in the distributor were occluded.

The present invention is thus an improved fertilizer applicator attachment. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 1 is a left side elevational view of an agricultural chemical applicator truck with which the invention in accordance with this document is used;

FIG. 2 is a fragmentary rear perspective view of the attachment of the present invention;

FIG. 3 is a fragmentary auxiliary perspective detailed view of part of the structure illustrated in view of FIG. 2;

FIG. 4 is a top rear perspective view illustrating the present invention, some portions being removed;

FIG. 5 is a perspective view of a sub-assembly of a gang of plungers;

FIG. 6 is a perspective view illustrating the manifold within the distributor head;

FIG. 7 is a fragmentary sectional detailed view taken generally along the line 7—7 in FIG. 4;

FIG. 8 is a view similar to that of FIG. 7 showing an extended position of a plunger;

FIG. 9 is a sectional plan view taken generally along line 9—9 in FIG. 1; and FIG. 10 is a fragmentary panoramic sectional view taken generally along line 10—10 in FIG. 9.

DETAILED DESCRIPTION OF THE INVENTION

Referring now to the drawings wherein like reference numerals denote like elements throughout the several views, FIG. 1 illustrates a vehicle 20 with which a fertilizer distributor 22 employing the present invention can be used. The vehicle 20 includes a cab 24 in which controls (not shown) for controlling operation of the invention can be mounted. Rearwardly from the cab 24 is a reservoir 26, or tank, in which products to be applied to a crop can be maintained. An auger or similar transport mechanism can be provided in the bottom of the reservoir 26 for conveying those materials outwardly from the reservoir 26. It will be understood, that any appropriate conveying means can be employed for this purpose.

A fertilizer distributor 22 is mounted to the rear of the reservoir 26. A conveying conduit 28 housing the auger serves as a lower port for mounting the distributor 22, and FIG. 1 shows an upper support 30 for providing additional structural integrity.

An elbow 32 is provided to permit redirection of flow of a mixture of fertilizer and pesticide upwardly toward a distributor head 34 of the overall distribution system. Again, an auger housed in a duct 36 can be used to convey the pasty mixture upwardly into the distributor head 34.

FIG. 6 best illustrates the construction of the distributor head 34, and further description with regard to the head 34 will be had with regard to that figure. The head 34 defines a manifold chamber 38 therewithin. The manifold chamber 38 has a generally annular floor 40, the vertical fertilizer conveyance duct 36 communicating with the chamber 38 through a central opening 42 in the floor 40.

The sides of the manifold chamber 38 are closed by a generally circularly-cylinderical side wall 44. A plurality of peripherally-disposed, circumfertially-spaced entry ports 46 are formed in the floor 40 about the periphery thereof. These entry ports 46 provide access to a corresponding plurality of distributor conduits 48 as will be discussed hereinafter.

A system of vanes 50 or baffles is positioned within the manifold chamber 38. A generally horseshoe-shaped construction is given to each vane 50 portion surrounding one of the entry ports 46. The vanes 50 are oriented so that the fertilizer preparation which is impelled radially outwardly and to some extent, circumferentially, will be directed to the individual entry ports 46.

As previously discussed, the fertilizer preparation will be conveyed upwardly by auger means, or other appropriate structure, through the vertical conveyance duct 36. A rotor 52 extends upwardly centrally within that duct 36, and the upper end of the rotor 52 is provided with a plurality of paddles 54. The rotor 52 is designed to impart rotational motion to the paddles 54 about a generally vertically-extending axis.

As the fertilizer is conveyed upwardly, a small, generally vertically-extending panel 56 will, at the end of the auger run, divert the mixture upwardly into the path of the paddles 54. As the paddles 54 rotate, circumferential motion will be imparted to the fertilizer within the manifold chamber 38. Such motion will, in turn, function to impel the mixture centrifugally outward. The motion will tend to be at a defined angle relative to a radius of the head 34, and the vane orientation is made to be generally parallel to the movement of the fertilizer within the head 34.

The underside of the floor 40 of the chamber 38 is provided with a plurality of nipples 58, the number corresponding to the number of entry ports 46 providing access into distributor conduits 48. These nipples 58 are welded or secured by other means to the underside of the floor 40 so that the nipples 58 are registered with the entry ports 46.

A flexible distributor conduit 48 is attached to each nipple 58 by appropriate means. FIG. 2 illustrates a band 60 tightly pinching each conduit 48 to its corresponding nipple 58.

FIG. 1 illustrates one of a pair of booms 62 mounted to the distribution assembly 22. These booms 62 can be pivotally mounted for movement between generally vertically-extending, "rigged-in" positions, and cantilevered, laterally-extending, "rigged-out" positions. The booms 62 would be rigged-in for transport, but would be rigged-out for operation.

The end of each distributor conduit 48 opposite that end by which it is mated to a nipple 58 is connected to a location on a boom 62. The locations are spaced along the various booms 62 so that fertilizer distribution will be spread over a relatively wide swath as the vehicle 20 passes through a field to be fertilized. As previously discussed in this document, the typical length of a single boom 62 is approximately 30 feet. With dual booms 62, a swath of approximately 60 feet can be achieved.

Figure 6:
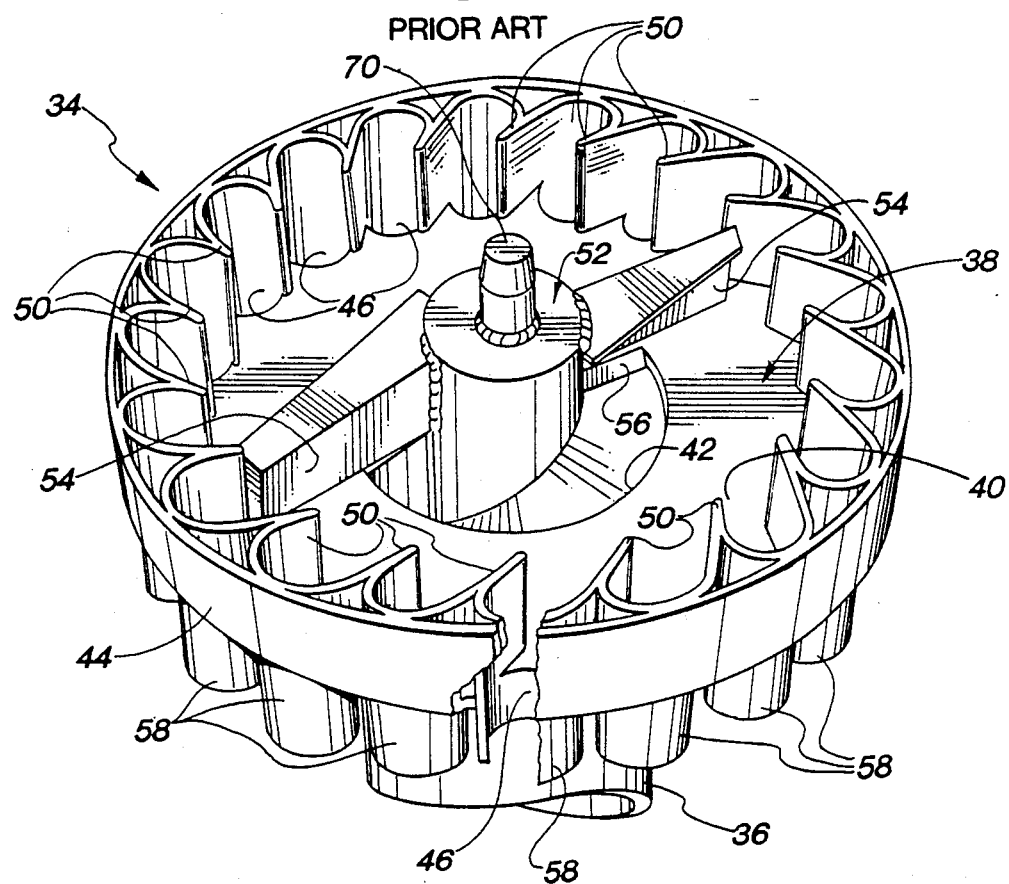
Figure 9:
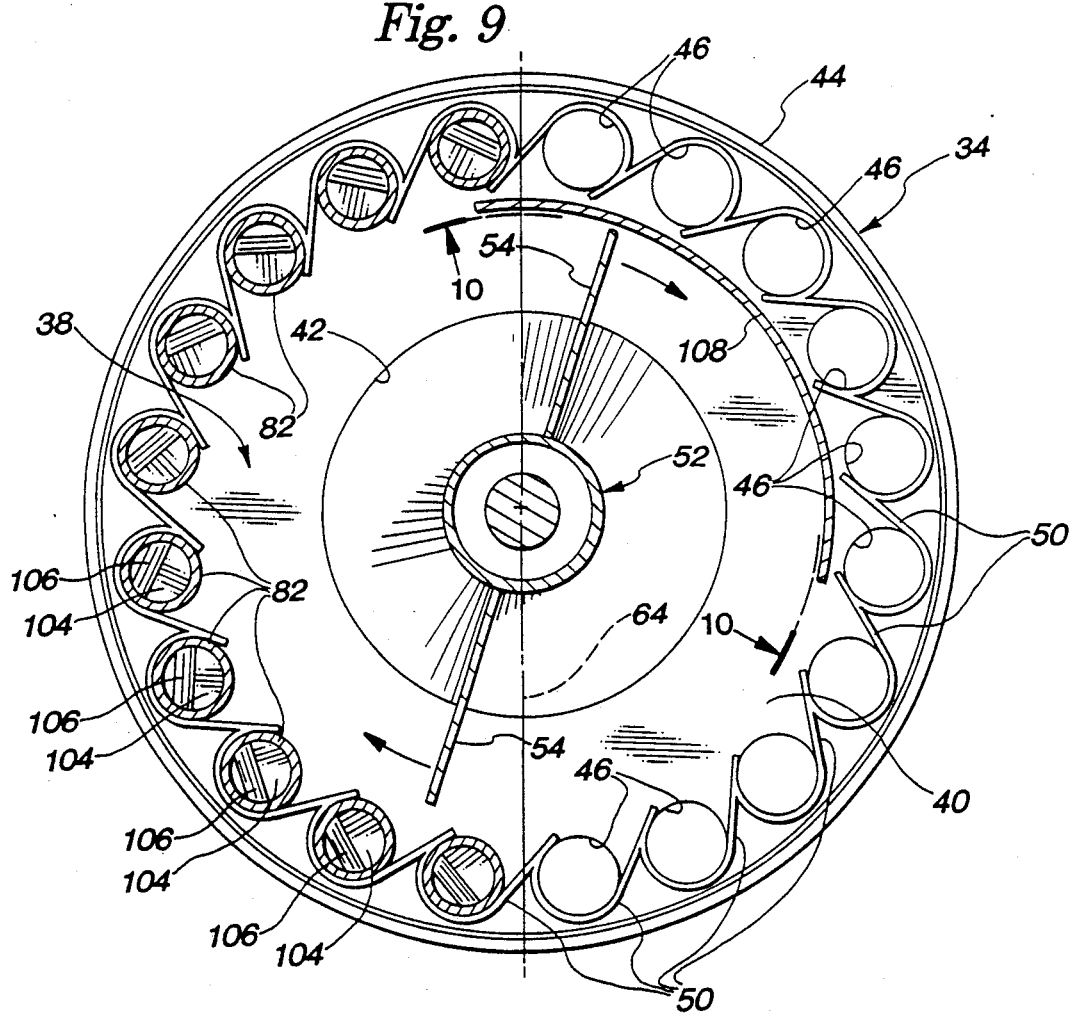

FIGS. 6 and 9 illustrate a distributor head 34 having twenty ports 46 formed therein. Ten ports 46 are disposed on either side of a center-line 64 of the distributor head 34. It will be understood that the distributor head 34 is oriented with respect to the carrying vehicle 20 so that the center-line 64 of the distributor head 34 is substantially parallel to the center-line of the vehicle 20. Distributor conduits 48 extending from entry ports 46 to the left of the center-line 64 of the head 34 will extend to the left boom, therefore, and distributor conduits 48 having entry ports 46 to the right of the center-line 64 of the head 34 will extend to the right boom.

The structure defined to this point is not new and is practiced in the prior art. It has been discussed, however, to illustrate the structure with which the present invention cooperates and the environment in which it functions.

The invention includes a cover plate 66 which closes the top of the distributor manifold chamber 38. The cover plate 66 is provided with a central aperture 68 for accommodating the upper end of the rotor axle 70. The cover plate 66, thereby, journals that axle 70 to support the rotor 52 for rotation.

The cover plate 66 is also provided with a series of peripherally-disposed circumferentially-spaced apertures 72 which correspond in number to the number of entry ports 46 formed in the floor 40 of the manifold chamber 38. They are similar in size to the entry ports 46, and the plate 66 is attached to the peripheral wall 44 of the chamber 38 so that one of the apertures 72 is generally in registration with each of the entry ports 46.

As seen in FIG. 2, a plurality of circumferentially-spaced, over-center latches 74 can be utilized to secure the plate 66 to the peripheral wall 44 of the manifold chamber 38, the plate 66 being provided with a lip 76 which the latches 74 can engage and secure. As seen in FIG. 2 also, the manifold chamber peripheral wall 44 and the closure plate 66 can both be provided with orientation fittings 78. These fittings 78 are provided with similarly sized apertures, so as to receive a bolt 80 through corresponding apertures when those apertures are in registration. When bolts 80 are fitted into corresponding apertures in these fittings 78, the closure plate 66 is oriented so that the peripherally-disposed, circumferentially-spaced apertures 72 are in registration with their corresponding entry ports 46 to the distributor conduits 48.

Figure 5:
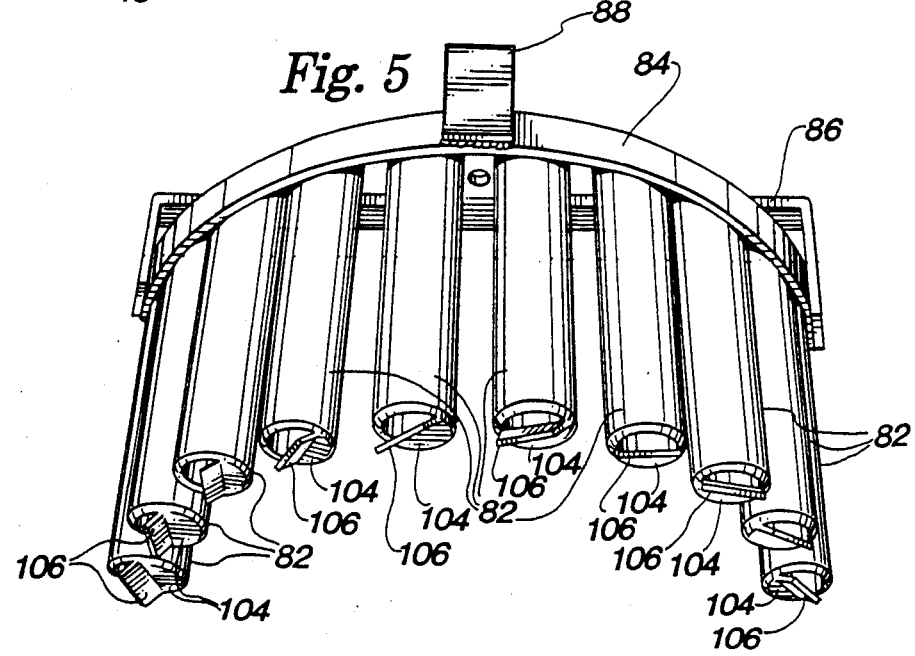

FIG. 5 illustrates a gang of plungers 82 which is employed in the invention. It will be understood, in view of this disclosure, that two of such gangs are intended to be used in operation of the distributor 22.

The gang of plungers 82 illustrated in FIG. 5 is provided with ten individual plunger units. The individual plungers 82 are secured to a mounting strap 84 by appropriate means such as welding.

The strap 84 is shown as being arcuate in configuration, and the measure of arcuity afforded to the strap 84 substantially corresponds to that afforded to the peripheral wall 44 of the manifold chamber 38. The individual plungers 82 are attached to the strap 84 so that, when the gang of plungers 82 is attached to the top of the distributor head 34, as will be described hereinafter, one plunger 82 will be able to be received in each of the apertures 72 on one side of the center-line of the closure plate 66. As will be able to be seen then, the apertures 72 in the closure plate 66 being registrable with corresponding entry ports 46, when the gang is received in the apertures 72 in the closure plate 66 as described above, distal ends of the individual plungers 82 of the gang will be able to extend downward into corresponding entry ports 46, since the plungers 82 are given an axial dimension greater than the distance between the closure plate 66 and the floor 40 of the manifold chamber 38.

As seen in FIGS. 4 and 5 each plunger gang can be provided with a bridge 86 extending across the gang from the upper ends of the endmost units. Each gang can also, if desired, be provided with an actuator bracket 88. The bracket 88 illustrated in the figures is oriented generally perpendicular to the corresponding bridge 86 of the gang and extends from the bridge 86, generally centrally therealong to a point radially outwardly from the line of plungers 82 and, thereafter, downwardly to be affixed to the mounting strap 84. Welding is an appropriate manner for securing the bridge 86, at either end thereof, to the mounting strap 84 and the actuator bracket 88 to the bridge 86 and the mounting strap 84.

FIG. 4 illustrates the right and left gangs of plungers 82 attached to the closure plate 66 for the manifold chamber 38. Attachment is shown as being indirect through pneumatic actuators 90, 92. A left pneumatic cylinder actuator 90 is affixed to the upper surface 94 of the closure plate 66 at a location so that the ram 96 thereof will be able to be secured to the actuator bracket 88 of the left gang, when the gang is in position so that the individual plungers 82 thereof are received within the apertures 72 on the left side of the center-line of the closure plate 66. The ram 96 can be secured to the actuator bracket 88 by any appropriate means such as a bolt 98.

The vertical length of the actuator housing 90 and of the corresponding ram 96 are such, relative to the length of the individual plungers 82 in the gang, so that, when the ram 96 is fully extended, the plungers 82 will extend downwardly below the closure plate 66 only a short distance. Consequently, centrifugally-impelled fertilizer will be able to pass radially outwardly within the manifold chamber 38, between the various vanes 50 defining entry to ports 46 in the floor 40 of the chamber 38 with which the plungers 82 are in registration, through the entry ports 46, and into the associated distributor conduits 48. The vertical length of the housing 90 and the ram 96, relative to the lengths of the plungers 82, however, are such that, when the ram 96 is retracted, the plungers 82 will be urged downwardly through the manifold chamber 38 so that distal ends of the plungers 82 pass into the entry ports 46 to occlude passage of fertilizer through those ports 46.

As seen in FIG. 4, each cylinder actuator housing 90, 92 is provided with a pair of fittings 100, 100' and attached pneumatic hoses 102, 102'. Each fitting 100, 100' is on an opposite side of a piston (not shown) received within the housing 90, 92. Consequently, by regulating the flow of air into, and out of, a chamber on either side of the piston, upward and downward movement of the ram 96 can be controlled.

As best seen in FIGS. 3, 5, 7, and 8, lower ends of the plungers 82 are provided with walls 104 at least a portion of which is angled as at 106. The angled portions 106 are oriented so that an axis perpendicular thereto is generally parallel to the direction in which fertilizer will enter between the vanes 50 directing the fertilizer to the corresponding entry port 46. When the ram 96 is extended, therefore, to raise the plunger bank to its uppermost position, the retraction of the plungers 82 will not only function to permit flow of fertilizer into the distributor conduits 48, but the positioning of the plungers 82 and the angled portions 106 of the lower walls 104 thereof will also serve to direct the fertilizer downwardly through the corresponding entry ports 46, and into the associated distributor conduits 48.

To this point, only the left gang, or bank, of plungers 82 has been described. It should be understood that the right bank is structurally connected to the closure plate 66 in a similar manner to the left bank, through its corresponding pneumatic cylinder actuator 92. Operation of the gang, to urge it upwardly and downwardly, is effected in the same manner as with the left gang.

During field operation of the fertilizer distribution system 22, the operator will continue fertilization until it is determined, either by stopping and visually inspecting, or through statistical evaluation with regard to plugging, that the entry ports 46 to the distributor conduits 48 are sufficiently occluded so that cleaning becomes necessary. As should be clear in view of this disclosure, both banks of plungers 82 would be retracted to the upward positions during normal operations. When the operator determines a cleaning is necessary, he need only activate a switch in the cab 24 for each pneumatic cylinder actuator 90, 92. Typically, this would be done by time statistics, and cleaning could be accomplished during a turn of the vehicle 20. Time could, thereby, be conserved.

The actuation of the cylinders 90, 92 will urge the plungers 82 downwardly into and through the corresponding entry ports 46 to the distributor conduits 48. Any build-up of the pasty fertilizer mixture between the vanes 50 directing the fertilizer to the entry ports 46, and above the entry ports 46 will be driven downwardly into the distributor conduits 48. The residual build-up is, in this manner, purged, and the head 34 is cleaned for continued efficient operation.

Figure 7:
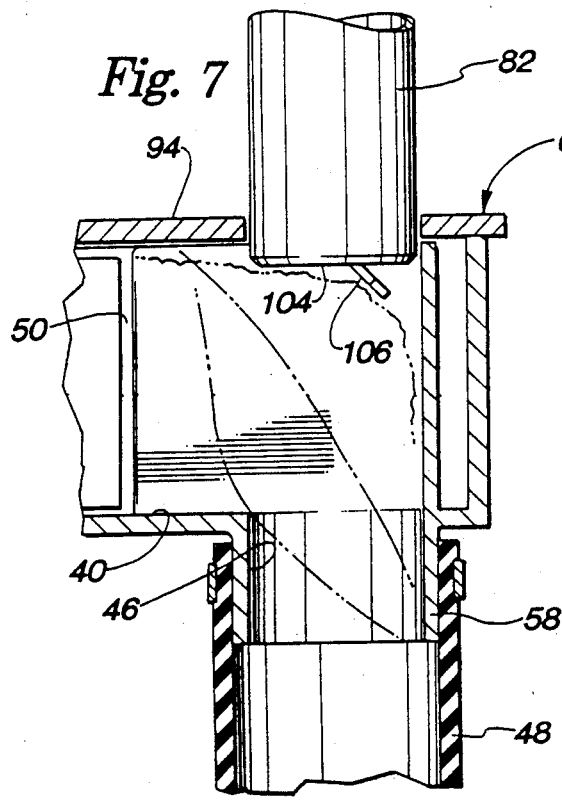
Figure 8:
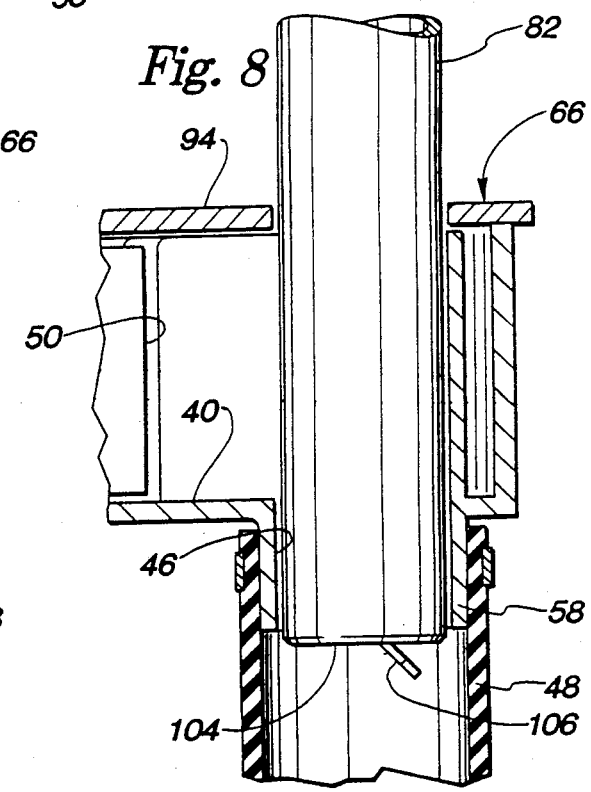

FIGS. 7 and 8 illustrate the extent of vertical movement of a single plunger 82 with respect to its corresponding entry port 46. As previously indicated, the distal end of the plunger 82, when the plunger 82 is retracted, extends downwardly beneath the closure plate 66 only a small distance. The plunger 82, in its extended position, however, extends downwardly so that the distal end thereof is slightly below the bottom of the nipple 58. As can be seen then, cleaning can be accomplished through the full vertical dimension of the manifold chamber 38 and the vertical dimension of the nipple 58.

With regard to the method of actuation of the various actuators 90, 92, it will be understood that pneumatic actuation is not exclusive. Other fluid actuation methods are contemplated and could certainly be employed in the functioning of the invention.

Figure 10:
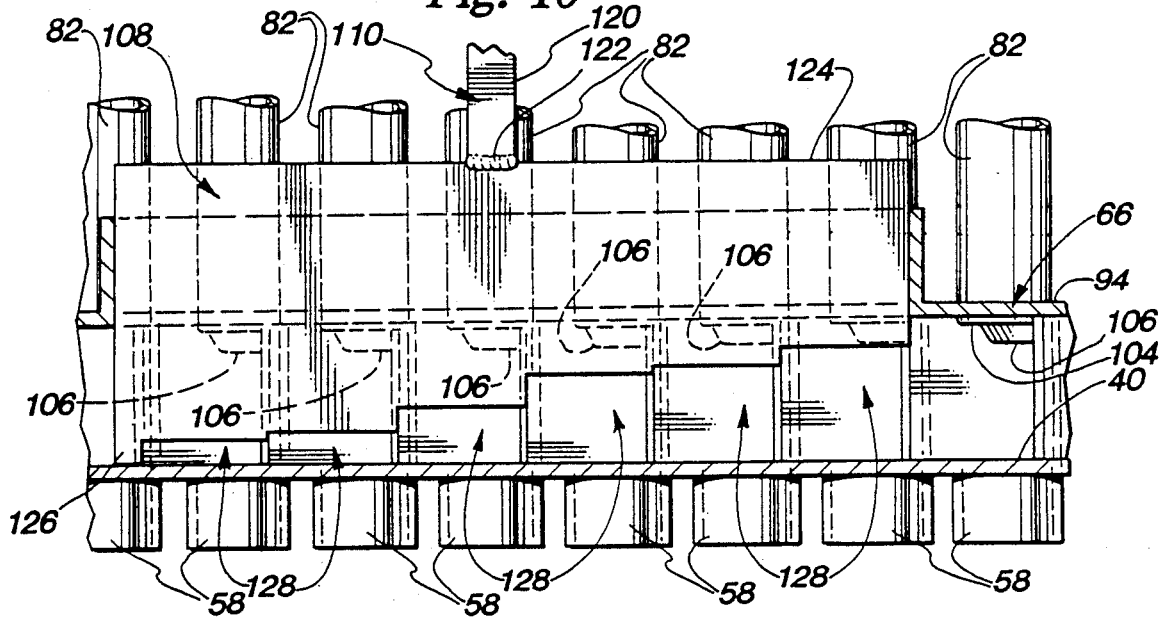

FIGS. 4, 9, and 10 illustrate an arcuate wall 108 mounted immediately radially inwardly from a portion of the vanes 50 and their corresponding distributor entry ports 46. The wall 108 is disposed for up-and-down movement, it being mounted to an actuator strap 110, which is, in turn, mounted to a ram 112 of third pneumatic cylinder actuator 114. The cylinder actuator 114 can be of a type the same, or similar, to the two actuators 90, 92 employed for moving the banks of plungers 82 between their retracted and extended positions.

The actuator strap 110 is shown as being a generally L-shaped bracket. The bracket is inverted so that a short leg 116 thereof is secured, at its distal end, by bolt means 118, to the ram 112. The lower end of the longer leg 120 is secured, for example, by welding, as at 122, to the upper edge 124 of the wall 108.

As previously discussed in this document, the present invention can be employed for governing through which distributor conduits 48 fertilizer will be channelled. This can be done by the operator selectively actuating the pneumatic cylinder actuator 90 for the left bank of plungers, as viewed in FIG. 9, to urge those plungers downwardly to occlude passage of fertilizer through the entry ports 46 to the left of the center-line 64. Fertilizer will, thereby, be permitted to pass only through the entry ports to the right of the center-line 64 and into the distributor conduits 48 going to the right boom. The assumption is, of course, that the right pneumatic cylinder actuator 92 is manipulated so that the right bank of plungers 82 is maintained in its upper, retracted position.

As seen in FIG. 9, in the embodiment illustrated therein, rotation of the rotor 52 and the attached paddles 54 is in a clockwise direction. The centrifugal feeding of fertilizer will be throughout 360°. As a result, therefore, there will tend to be a build-up of fertilizer at a first entry port, with respect to the direction of rotation of the rotor 52. The paddles 54 will tend to drag the fertilizer urged outwardly to the left of the center-line along until it comes to an unobstructive entry port 46. A build-up and increased pressure will thus be brought to bear upon the first entry port to the right of the center-line 64.

It is the intent, however, of a distributor system to distribute fertilizer substantially equally throughout all of the points of application along a boom 62. Consequently, the arcuate wall 108 is provided to effect metering in order to achieve this equivalency.

FIG. 10 illustrates the wall 108, or plate, in its lower position wherein a foot 126 of the plate 108 is in engagement with the floor 40 of the manifold chamber 38.

As seen in FIG. 10, the lower edge of the wall is stepped upwardly so that windows 128, or gates, for feeding fertilizer to adjacent entry ports to distributor conduits increase in size sequentially. This is so since, as fertilizer material is metered through successive ports 46, pressure will decrease. Consequently, successively increasing-in-size gates 128 are appropriate.

It will be noted that the wall 108 shown has only six stepped gates 128. It has been found that, after passage of the material beyond the sixth unobstructed entry port 46, the pressure decreases to approximately the same as it would be if the left bank of plungers 82 were not positioned in their extended, occluding positions.

It will also be noted that the steps are not equal in their vertical dimension. Statistical analysis has shown that substantially equal distribution of fertilizer can be achieved by providing gates 128 having defined vertical dimensions. It will be understood, however, vertical dimensions of gates 128 can vary depending upon the density of the material being distributed.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. Apparatus for cleaning a peripherally-disposed, centrifugally-fed entry port to a distributor conduit extending from a fertilizer distributor head, comprising:
    (a) a plunger having a distal end defined by a wall, said plunger being disposed for movement between a retracted position, wherein said distal end is located so as to permit free centrifugal flow of fertilizer within the distributor head, through the entry port, and into the distributor conduit, and an extended position, wherein said distal end extends through the entry port; and
    (b) means for selectively moving said plunger between said retracted and said extended positions;
    (c) wherein at least a portion of said wall is angled so that, when said plunger is in said retracted position, said angled portion will deflect fertilizer through the entry port and into the distributor conduit.

2. Apparatus in accordance with claim 1 wherein said entry port is disposed generally perpendicular to a substantially vertically-extending axis, and wherein said plunger is disposed for up-and-down movement between an upper retracted position and a lower extended position.

3. Apparatus in accordance with claim 1 wherein said means for selectively moving said plunger between said retracted and said extended positions comprises a pneumatic cylinder actuator.

4. Apparatus for cleaning a plurality of peripherally-disposed, circumferentially-spaced, centrifugally-fed entry ports to corresponding distributor conduits extending from a fertilizer distributor head, wherein a first portion of adjacent entry ports open into distributor conduits leading to a boom on a first side of a vehicle carrying a device of which the fertilizer distributor head is a part, and a second portion of adjacent entry ports open into distributor conduits leading to a boom on a second side of the vehicle, and for governing through which ports fertilizer is distributed, comprising:
    (a) a first plurality of ganged-together plungers, each corresponding to, and being registered with, one of said first portion of adjacent entry ports, said first plurality of plungers being mated together so that all of them are aggregately disposed for movement between retracted positions, wherein distal ends thereof are located so as to permit free centrifugal flow of fertilizer within the distributor head, through the first portion of adjacent entry ports, and into distributor conduits leading to the boom on the first side of the vehicle, and extended positions, wherein said first plurality of ganged-together plungers extend into the first portion of adjacent entry ports to preclude flow of fertilizer therethrough;
    (b) a second plurality of ganged-together plungers, each corresponding to, and being registered with, one of said second portion of adjacent entry ports, said second plurality of plungers being mated together so that all of them are aggregately disposed for movement between retracted positions, wherein distal ends thereof are located so as to permit free centrifugal flow of fertilizer within the distributor head, through the second portion of adjacent entry ports, and into distributor conduits leading to the boom on the second side of the vehicle, and extended positions, wherein said second plurality of ganged-together plungers extend into the second portion of adjacent entry ports to preclude flow of fertilizer therethrough; and
    (c) means for selectively moving each of said first and second pluralities of ganged-together plungers between their retracted and extended positions.

5. Apparatus in accordance with claim 4 wherein said first portion of adjacent entry ports comprises those entry ports lying on a side of a center-line axis of the fertilizer distributor head the same as said boom on the first side of the vehicle, and said second portion of adjacent entry ports comprises those entry ports lying on a side of the center-line axis of the fertilizer distributor head the same as said boom on the second side of the vehicle.

6. Apparatus in accordance with claim 5 wherein said entry ports are disposed generally perpendicular to a substantially vertically-extending axis, and wherein said pluralities of ganged-together plungers are disposed for up-and-down movement between upper retracted positions and lower extended positions.

7. Apparatus in accordance with claim 6 wherein said means for selectively moving said pluralities of ganged-together plungers between retracted and extended positions comprises first and second pneumatic cylinder actuators, each actuator operatively linked to a corresponding plurality of ganged-together plungers.

* * * * *